APPARATUS FOR WASHING PATIENTS HYGIENICALLY

Original Filed Dec. 26, 1968

United States Patent

Re. 28,405
Reissued May 6, 1975

28,405

APPARATUS FOR WASHING PATIENTS HYGIENICALLY

Soren Sollerud, Norrkoping, Sweden, assignor to Svenska Utvecklingsaktiebolaget, Stockholm, Sweden

Original No. 3,574,239, dated Apr. 13, 1971, Ser. No. 786,988, Dec. 26, 1968. Application for reissue Nov. 9, 1972, Ser. No. 305,001
Claims priority, application Sweden, Jan. 12, 1968, 448/68
Int. Cl. A47k *7/00, 17/00*
U.S. Cl. 4—1 20 Claims

Matter enclosed in heavy brackets [ ] appears in the original patent but forms no part of this reissue specification; matter printed in italics indicates the additions made by reissue.

ABSTRACT OF THE DISCLOSURE

The invention concerns apparatus for bathing a bedridden patient whereby washing medium continuously is supplied centrally through a pressure nozzle and after its use is sucked off peripherally through a suction nozzle arranged about the pressure nozzle.

This invention relates to a cleaning method and arrangement and particularly to a method and arrangement for cleaning surfaces.

It has always been a problem to wash surfaces, which are difficult to access or sensitive. This problem, however, was particularly great in hospitals and similar places with concern to patients who are bedridden or have a restricted power of motion.

It is generally known that of the three usual body-cleaning methods: washing, bathing and douching, the last-mentioned method is to be recommended most from a hygienic point of view. In nursing, however, where the hygiene requirements are particularly high, this method has proved not only difficult but even impossible to be applied to bedridden patients. The possibilities available today for washing of patients confined to their beds are restricted to the use of washing flannels or bath sponges, which are dampened in water to which soap or another detergent has been added, followed by drying with a towel. The disadvantages of this kind of washing are obvious, both as regards the result and with respect to hygiene, particularly when it concerns patients suffering from spontaneous intestinal secretions. For the staff this method is awkward, time consuming and unaesthetic, and in many cases it constitutes an obstruction to the recruiting of labour for these nursing professions.

In hospitals for infectious diseases and in other nursing sections involving great risks of infection one tries to isolate the infection by providing a bathroom and water closet for the individual patient. It is desired to burn up all refuse from such nursing places. This is possible as far as bladder and intestinal secretions are concerned which can be collected in plastic bags filled with wood dust or the like. Such a method is troublesome and at times even impossible to be carried out when it refers to used bath or washing water. Moreover, from a discharge technical point of view the bathtub propides a protection which is most ineffective against micro-organic return flow.

Sterilization of water in necessary quantities, or the supply and storage of fresh water, for obtaining a fully satisfactory hygiene, if these measures are taken at all, involve considerable investments of material and personnel.

The aforementioned drawbacks and deficiencies with concern to hygiene can be doubled many times over, and all of them also can be eliminated if the water traps and sewer were not restricted to their place, further if the water flow could be controlled so as only to be brought into contact with the place to be washed, if the water volume could be reduced to the small percentage of molecules, which really are active in the cleaning process, and if the cleaning process could be carried out without manual contact with the soiled place.

The present invention has as its objects to eliminate the shortcomings involved in the present washing methods.

The invention relates to a method of washing bedridden patients in an easy, quick and lenient manner, and it is characterized in that a washing medium of originally small volume is made voluminous and is continuously supplied locally to the skin of the patient where it acts for a short time, and is removed for disinfection together with impurities washed off.

The invention also includes an arrangement for carrying out the method, which arrangement substantially is characterized by a compressor, a washing medium preparing apparatus, a suction pump, a collecting vessel for used washing medium and a combined pressure and suction nozzle.

Washing or douching under running water, which continuously is renewed, was taken as a pattern for the design of the present invention, which is based on the principle of generating the washing medium to such a form, that both the washing medium and its localization when being applied can be controlled. This can be achieved, for example, by adding surface-active substances to the water in a closed vessel and thereafter by filtered compressed air to effect a foam of suitable density and duration.

By directing the prepared foam directly from the generator to the zone in question on the patient's body, via a flexible hose provided with an exchangeable end nozzle of, for example, foamed plastic, the greatest possible protection against infection by the washing medium is obtained. In the immediate vicinity of or concentrically with the washing nozzle an exchangeable suction nozzle is mounted which preferably can be made of foamed plastic, whereby it is possible with one and the same motion to supply the washing medium, to wash and to suck up used washing medium. As a complement a special foam-wetted suction hose of greater dimension is provided for sucking up possible intestinal secretions, vomitings etc.

The invention is described in greater detail in the following, with reference to the accompanying drawing showing an embodiment of the arrangement according to the invention.

Figure 1:
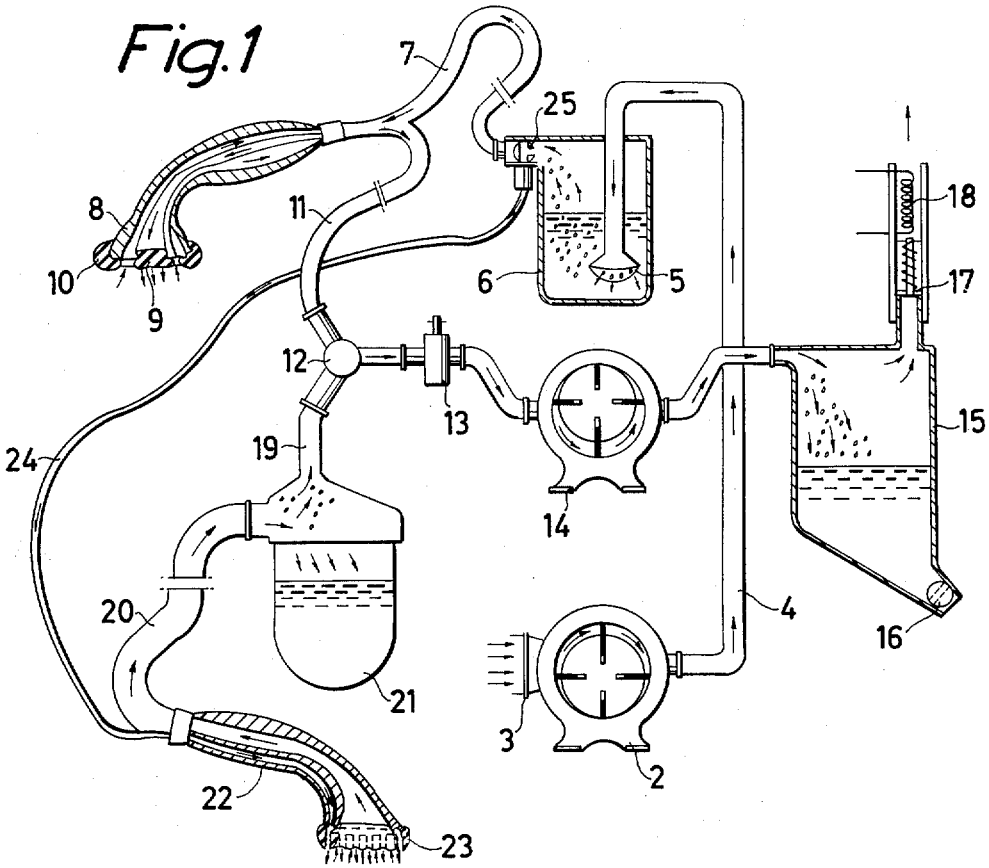
FIG. 1 shows a schematic view of the arrangement according to the present invention.
Figure 2:
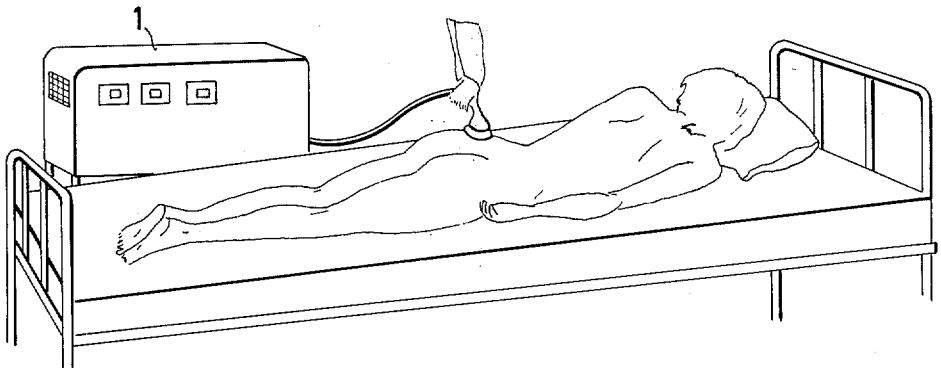
FIG. 2 shows in principle how the arrangement is applied.

In a cart 1 an electric compressor 2 is mounted and provided with a bacteria filter 3 for the input air, which subsequent to its compression via a pipe 4 is directed out through an atomizing nozzle 5 into a liquid vessel 6 containing a solution of, for example, 99 percent water and 1 percent surface-active substance. The airflow gives rise to the formation of foam, which via a hose 7 is pressed out through a nozzle 8 provided with an exchangeable bath sponge 9. The nozzle 8 includes a concentric passageway extending about the bath sponge 9 the outer edge of which is provided with an exchangeable ring 10 of air-permeable foamed plastic. The concentric passageway communicates via a hose 11, a three-way valve 12 and a safety valve 13 with an electric vacuum pump 14, which on its pressure side is connected with a pressure container 15 provided with an outlet valve 16 and a spring-loaded valve 17, which opens at an overpressure of approximately one atmosphere whereafter the discharged air is urged to pass through a cleaner 18 consisting of an electric filament spiral. The aforementioned three-way valve 12 can, if required, be adjusted so as to connect a pipe-connecting piece 19 with the vacuum pump 14, instead of the suction passageway in the washing nozzle 8. Said connecting piece 19 comprises an upright connection to the three-way valve and a laterally directed connection to a hose 20, and, besides, it is formed on its lower surface so as to provide a holding portion for a detachable container 21 of transparent material. The hose 20 is connected to a suction nozzle 22, which is provided with an exchangeable contact safety device 23 of nonrigid plastic, and which, besides, is provided with recesses for the inlet of air in order not to impede the airflow, and also with holes corresponding to passageways arranged in the suction nozzle 22, which passageways via a hose 24 are connected to the vessel 6 and hose 7 through the valve 25. The pipe connection 19–23 is intended for sucking up intestinal secretions, vomitings etc.

A patient lying in bed is washed in the manner as follows. After the washing medium (the surface-activated water) has been filled in and washing agent as well as possibly other agents desired for the patient have been added, the apparatus is moved to the patient where it is connected to an electric wall socket and prepared with new or cleaned nozzles and sponges. Thereafter the patient is uncovered. If the patient is found to be heavily soiled by evacuations from the bowel or of other type, first this coarse substance is removed by the evacuation suction nozzle 22, after the three-way valves 12 and 25 had been adjusted to sucking action and foam supply, respectively, in said [nozzled] *nozzle,* whereby also highly adhesive impurities can be sucked up and transported via the hose 20 to the container 21. Thereafter the three-way valves 12 and 25 are adjusted to sucking action and foam supply, respectively, in the nozzle 8, and the washing procedure is commenced. The nurse washes the patient from the head downwards, and by alternatingly starting and stopping both the compressor and the vacuum pump the nurse can control the supply of foam as well as the time for washing by using the sponge.

From 3 litres of surface-activated water approximately 60 litres foam are obtained which, after it was sucked up and compressed in a pressure container 15, is given a volume of approximately 15 litres. A quantity of approximately 3 litres foam is sufficient for washing a patient soiled to an average extent.

The safety valve 13 is set for a vacuum limit, which is of no danger to the patient, and it starts operation when the ring 10 or the contact safety device 23 for some reason does not allow air to pass through.

Other embodiments of the invention can be imagined without abandoning the idea of the invention, such as stationary installations with connections for washing medium and vacuum located near the patient's bed, and systems with entirely separated washing and suction nozzles.

To the washing medium may also be added antiseptic or other agents recommended by a physician. The design of the invention also allows for medical treatment possibilities where the physician individually can prescribe a therapeutic agent to be added to the washing medium. The liquid vessel 6 of the apparatus is provided with inlet ducts for medical additives, and the collecting containers 15 and 21 are provided with inlet ducts for disinfecting agents possibly added.

It is easy to realize the considerable advantages offered by the invention. The costs for washing a patient are substantially reduced both due to the low costs of the generated washing medium and by the capacity rendered possible by the invention. The washing procedure involves for the patient and the staff a social-ethical improvement, which has a favorable effect on the hard-working nursing staff. As a result of the invention can be mentioned the possibility of reducing in nursing the expensive nosocomial infections. The entire washing procedure and the operation of the apparatus requires only one person, and the patient need not be lifted but has only to be turned on his side, in which position the patient, if necessary, can be supported during the washing procedure by a plastic cushion. As the apparatus operates substantially noiselessly, the patients are not subjected to any disturbing noises. Owing to the large capacity of the arrangements all patients, whether they are confined to their beds or not, can be washed within the ward and, thus, the usual time-consuming transport to the bathing department is no longer necessary.

As a complement to the apparatus, a liquid-lubricated evacuation sucking device with a throwaway container for the collection of evacuations can be mounted, and it also is possible to add to the washing medium skin-stimulating agents, antiseptic or other agents recommended by a physician, which in combination with the careful washing according to this method render it possible also to wash patients who under other circumstances must be washed with cotton and spirits.

The effectiveness with respect to volume can be understood by a comparison between the three litres of washing medium and the resulting up to 800 litres of foam, depending on the density of the foam, which is sufficient for a total washing of 100 patients soiled to an average extent.

The apparatus can also be provided with connections for washing nozzle and evacuation sucking device, so that the entire apparatus can be flushed with a circulating disinfecting liquid.

Conclusively it may be mentioned, that the continuously increasing use of antibiotics in nursing enforces the production of increasingly vigorous virus. Against these virus one tries to defend oneself, above all by using throwaway material to the greatest possible extent. It can be safely assumed, therefore, that within a few years it will be desirable to destroy after every washing both the washing nozzle and the hoses as well as the internal equipment in the vacuum pump. The economic possibilities therefor are not insurmountable in connection with the arrangement according to the invention.

The invention though having been shown and described in connection with the washing of bedridden patients is, of course, not restricted thereto. The invention is extremely well adapted [a.o. also] for the washing of surfaces with difficult access, such as ceilings and wall sections located at a greater height, in which case the washing nozzle can be mounted on a long rod or a pipe. The advantage offered by the invention is obvious. The entire cleaning process is carried in one moment and the washed surface section is left clean and dry or substantially dry. No washing sponges or brushes or running water or drying flannels are required. The work itself is clean, easily and rapidly performed and renders optimum results.

I claim:

1. Apparatus for washing patients hygienically with minimum disturbance of the patient comprising a closed container for a washing liquid containing a small amount of a surface-active agent, means for compressing air, means for supplying compressed air from said compressor means to said closed container in an atomized state to form a cleansing foam of the washing liquid, at least one application nozzle having *at least one* outlet *port* [ports] and *at least one* suction *port* [ports], two flexible tubular elements, one of said tubular elements connecting the outlet ports of said at least one nozzle to said closed container for supplying foam under pressure to the outlet ports of said nozzle for application of cleansing foam to the patient's skin, means for creating [of] suction, a closed collecting container, said second tubular element connecting the suction ports of said at least one nozzle to the suction-creating means for withdrawing the cleansing foam from the skin and passing it to the closed collecting container where the foam disintegrates, means for withdrawing at a predetermined pressure the gases liberated in said closed collecting container and means for heat cleaning said withdrawn gases and means for withdrawing the liquid from said collecting container.

2. Apparatus as claimed in claim 1 wherein the *suction*

[outlet] ports are arranged about the periphery of the *outlet* [suction] ports and further comprising a spongelike element disposed over the outlet ports for controlling the application of foam to the skin.

3. Apparatus as claimed in claim 1 wherein the suction side of said means for creating a suction is connected to the suction ports through said second tubular element and the pressure side of said means is connected to said collecting container.

4. Apparatus as claimed in claim 1 and further comprising a second nozzle having outlet ports and suction ports, a three-way valve in said first tubular element adjacent said closed container, means for directing foam from said valve to said second nozzle, a second three-way valve in said second tubular element adjacent said suction means, means affording communication between said second three-way valve and said second nozzle, whereby said three-way valves may establish communication with at least one of said two nozzles.

5. Apparatus as claimed in claim 1 wherein the suction ports are arranged around the periphery of the outlet ports and further comprising a spongelike element disposed over the outlet ports, whereby the application of foam to the skin is controlled and the outer surface of said sponge element serves as a washing means for the surface being cleansed.

6. Apparatus as claimed in claim 5 and further comprising a ring of spongelike material disposed about the periphery of the suction ports to protect the skin area being cleansed and to assure substantially complete removal of foam from the skin area.

7. Apparatus as claimed in claim 6 wherein the spongelike element disposed over the outlet ports and the spongelike element about the periphery of the suction ports are formed as a single element which is removably attached to the associated nozzle.

*8. Apparatus for cleaning a patient hygienically with minimum disturbance of the patient, comprising, in combination, supply container means for a washing medium compatible with human skin, a source of pressurized gas, means for supplying pressurized gas from said source to said supply container means to pressurize washing medium contained therein, collecting container means, suction-creating means, conduit means connecting said suction creating means to said collecting container means, at least one hand-manipulatable application nozzle having an exchangeable surface compatible with a patient's skin and adapted to overlie a localized area of the patient's skin, said nozzle having orifice means communicating with said surface, and flexible tubular element means connecting said orifice means of said nozzle to said supply container means and to said suction-creating means in a manner to effect application of washing medium through said orifice means to the patient's skin and withdrawal of the washing medium from the patient's skin for passage to said collecting container means through said conduit means.*

*9. Apparatus as defined in claim 8 wherein said orifice means comprises at least one outlet port and a plurality of suction ports, said suction ports being arranged about the periphery of said outlet ports, said exchangeable surface comprising a spongelike element disposed over said outlet ports for controlling the application of washing medium to the patient's skin.*

*10. Apparatus as claimed in claim 9, and further including a ring of sponge-like material disposed about the periphery of said suction ports to protect the skin area being cleansed and to assure substantially complete removal of washing medium from the skin area after discharge from said nozzle.*

*11. Apparatus as defined in claim 8 wherein said collector container means includes means for withdrawing at a predetermined pressure any gases liberated in said collector container, said collector container further including means for withdrawing liquid contained therein.*

*12. Apparatus as defined in claim 8 including safety valve means for limiting the suction applied against the patient's skin through said orifice means from said suction-creating means.*

*13. Apparatus for cleaning a patient hygienically with minimum disturbance of the patient, comprising, in combination, supply container means for a washing medium compatible with human skin, a source of pressurized gas, means for supplying pressurized gas from said source to said supply container means to pressurize washing medium contained therein, collecting container means, suction-creating means, conduit means connecting said suction-creating means to said collecting container means, a first hand-manipulatable application nozzle having an exchangeable surface compatible with a patient's skin and adapted to overlie a localized area of the patient's skin, said first nozzle having orifice means communicating with said surface, flexible tubular element means connecting said orifice means of said nozzle to said supply container means and to said suction-creating means in a manner to effect application of washing medium through said orifice means to the patient's skin and withdrawal of the washing medium from said patient's skin for passage to said collecting container means through said conduit means, a second hand-manipulatable nozzle having outlet ports and suction ports, means including first flow control valve means for directing washing medium from said supply container means to said outlet ports of said second nozzle, and means including second flow control valve means affording communication between said suction-creating means and said suction ports of said second nozzle, said first and second valve means being selectively operable to establish communication between either of said first and second nozzles and said supply and collecting container means.*

*14. Apparatus as defined in claim 13 wherein said washing medium comprises water containing a small amount of surface-active agent, and including means disposed within said supply container means for atomizing said pressurized gas supplied thereto to form a cleansing foam for discharge through said orifice means of said first nozzle.*

*15. Apparatus as defined in claim 13, wherein said first and second flow control valve means each comprises a three-way valve.*

*16. Apparatus as defined in claim 13 including additional collecting container means connected in fluid communication with said suction ports of said second nozzle for receiving washing medium and matter carried therein after discharge from said second nozzle.*

*17. A system for washing patients hygienically with a minimum disturbance of the patient, comprising, in combination, portable cart means moveable to positions generally adjacent patients to be washed, supply container means supported by said cart means for containing a quantity of a foamable washing medium, air pressure means supported by said cart means and connected in communication with the interior of said supply container means, collecting container means supported by said cart means, hand-manipulatable nozzle means having an exchangeable surface compatible with a patient's skin and adapted to overlie a localized area of the patient's skin, said nozzle means having discharge ports and suction return ports, first conduit means connecting said discharge ports of said nozzle means to said supply container means, second conduit means connecting said suction return ports of said nozzle means to said collecting container means, suction-creating means in communication with said suction return ports of said nozzle, said air pressure means being operable to effect discharge of a cleansing foam from said nozzle for application to a patient's skin, and said suction creating means being operable to effect return of the cleansing foam through said suction return ports of said nozzle to said collecting container means.*

*18. A system for washing patients hygienically with a minimum disturbance of the patient, comprising, in combination, portable cart means movable to positions generally adjacent patients to be washed, supply container*

*means supported by said cart means for containing a quantity of a foamable washing medium, air pressure means supported by said cart means and connected in communication with the interior of said supply container means, collecting container means supported by said cart means, first hand-manipulatable nozzle means having at least one discharge port and at least one suction return port, first conduit means connecting said discharge ports of said first nozzle means to said supply container means, second conduit means connecting said suction return ports of said first nozzle to said collecting container means, suction creating means in communication with said suction return ports of said first nozzle means, said air pressure means being operable to effect discharge of a cleansing foam from said first nozzle means for application to a patient's skin, said suction creating means being operable to effect return of the cleansing foam through said suction return ports of said first nozzle means to said collecting container means, second hand-manipulatable nozzle means having discharge ports and suction return ports connected, respectively, for fluid communication with said supply container means and said suction creating means, and valve means operable to effect selective discharge of cleansing foam from said discharge ports of said second nozzle means for application to a patient's skin and return of the discharged foam through said suction return ports of said second nozzle means to said collecting container means.*

*19. Apparatus for cleaning a patient with minimum disturbance to the patient, comprising, in combination, collecting container means for receiving extraneous substances from a patient's skin, suction-creating means, hand-manipulatable nozzle means having a hand grip portion and being lightweight and of sufficiently small size to be carried in one's hand for selective movement in contact with a patient's body, said nozzle means having an exchangeable surface area adapted to overlie a localized area of the patient's skin, said nozzle means having orifice means communicating with said surface area, said orifice means being of such a size as to allow inward flow therethrough of extraneous substances including solid particles disposed on the patient's skin being cleaned, and tubular element means interconnecting said suction-creating means, said collecting container means and said orifice means of said nozzle means in a manner to allow flow of extraneous matter from the patient's skin underlying said surface area of said nozzle means through said tubular element means to said collecting container means, said surface area of said nozzle means being replaceable so as to allow presentation of a new surface area to each patient cleaned by said apparatus.*

*20. Apparatus for cleaning a patient with minimum*

*disturbance of the patient, comprising, in combination, supply container means for a washing medium compatible with human skin, a source of pressurized gas, means for supplying pressurized gas from said source to said supply container means for pressurizing washing medium contained therein, collector container means, a source of subatmospheric pressure, first nozzle means having orifice means through which pressurized washing medium may be discharged onto and withdrawn from a patient's skin, second nozzle means having orifice means through which extraneous meatter on the patient's skin may be drawn, and flexible flow conduit means connected in communication with said supply container means, said source of subatmospheric pressure and said collector container means, said conduit means being adapted for selective connection to said first nozzle means to effect discharge of pressurized washing medium onto a patient's skin and withdraw said washing medium therefrom by suction for passage to said collector container means, or connection to said second nozzle means to withdraw extraneous matter from the patient's skin by suction and pass said matter to said collector container means.*

References Cited

The following references, cited by the Examiner, are of record in the patented file of this patent or the original patent.

UNITED STATES PATENTS

| | | | |
|---|---|---|---|
| 2,885,713 | 5/1959 | Morrill | 15—322 |
| 3,079,285 | 2/1963 | Rockwell | 15—321 |
| 2,999,258 | 9/1961 | Berberian | 15—321 |
| 1,929,345 | 10/1933 | Brown et al. | 15—321 |
| 3,089,790 | 5/1963 | Balamuth et al. | 15—321 |
| 3,121,896 | 2/1964 | Allen et al. | 15—321 |
| 3,538,535 | 11/1970 | Ginsburgh | 15—302 |
| 2,168,692 | 8/1939 | Vidal | 15—320 |
| 1,451,437 | 4/1923 | Bernier | 4—158 |
| 1,359,985 | 11/1920 | Gromer | 4—158 |

FOREIGN PATENTS

| | | | |
|---|---|---|---|
| 463,735 | 4/1937 | Great Britain | 15—321 |
| 449,826 | 1912 | France | 134—6 |
| 486,500 | 6/1938 | Great Britain | 134—21 |

JOHN W. HUCKERT, Primary Examiner

S. S. LEVY, Assistant Examiner

U.S. Cl. X.R.

4—158; 15—302, 321; 128—66, 248, 276; 134—21